United States Patent [19]

Simmons

[11] Patent Number: 4,938,546

[45] Date of Patent: * Jul. 3, 1990

[54] FLEXIBLE SNOWMOBILE CLEAT

[76] Inventor: Verlin M. Simmons, 495 S. Main St., Providence, Utah 84332

[*] Notice: The portion of the term of this patent subsequent to Jan. 3, 2006 has been disclaimed.

[21] Appl. No.: 291,945

[22] Filed: Dec. 28, 1988

Related U.S. Application Data

[63] Continuation-in-part of Ser. No. 31,696, Mar. 27, 1987, Pat. No. 4,795,221.

[51] Int. Cl.⁵ .................................. B62D 55/205
[52] U.S. Cl. ...................... 305/35 EB; 305/39; 305/46
[58] Field of Search .............. 305/35 R, 35 EB, 39, 305/46, 54

[56] References Cited

U.S. PATENT DOCUMENTS

| | | | |
|---|---|---|---|
| 2,992,862 | 7/1961 | Fredricks et al. | 305/54 X |
| 3,221,830 | 12/1965 | Walsh | 305/35 R X |
| 3,765,731 | 10/1973 | Kilbane, Jr. | 305/54 X |
| 3,782,787 | 1/1974 | Rubel et al. | 305/54 X |
| 3,838,894 | 10/1974 | Reedy | 305/54 X |
| 3,865,441 | 2/1975 | Jolliffe | 305/54 |
| 4,035,035 | 7/1977 | Husted | 305/35 R X |
| 4,278,302 | 7/1981 | Westimayer et al. | 305/35 EB |
| 4,795,221 | 1/1989 | Simmons | 305/35 EB |

FOREIGN PATENT DOCUMENTS 40299 7/1965 German Democratic Rep. .

Primary Examiner—Russell D. Stormer

[57] ABSTRACT

A cleat is disclosed for mounting on the outer surface of an endless belt used as a track for a snowmobile. The cleat comprises a relatively narrow, elongate, essentially planar fin whose elongate length is no greater than about ten centimeters and whose width is no greater than about 4 centimeters. A relatively narrow, elongate, essentially planar flange extends along an elongate side edge of the fin. The flange has an elongate length which is substantially the same as the length of the fin and a width which is no greater than about 4 centimeters. An opening through the flange is used for attaching the flange to the outer surface of an endless belt used as a track for a snowmobile. A plurality of sharp projections extend from the broad side of the flange which faces away from the planar fin. The projections are adapted to engage the outer surface of the endless belt when the cleat is attached to the endless belt. The fins slant with respect to the flanges such that an included angle is formed between the fins and the flanges, with the angle being between about 30 and 80 degrees. The fins provide improved traction for the track of the snowmobile upon which they are installed. The fins simultaneously provide lift to the track of the snowmobile thereby avoiding the tendency of the snowmobile to dig into and bog down in deep snow.

17 Claims, 1 Drawing Sheet

FLEXIBLE SNOWMOBILE CLEAT

BACKGROUND OF THE INVENTION

1. Related Applications

This application is a continuation-in-part of co-pending application Ser. No. 07/031,696, which issued as U.S. Pat. No. 4,795,221 on Jan. 3, 1989.

1. Field of the Invention

The present invention relates generally to endless traction belts or tracks used in driving snowmobiles. In particular, the present invention relates to improved cleats made of a flexible, resilient, elastomeric material and which when installed on the track of the snowmobile will greatly improve the ability of the track of the snowmobile to lift the track and the snowmobile upon snow, to drive the snowmobile at relatively high velocities over the snow and to propel the snowmobile over deep, powder snow.

2. State of the Art

Snowmobiles are used extensively in snowy regions, not only for everyday use, but they are also used widely for recreational and emergency purposes. Snowmobiles are operated on a wide variety of terrain. They are used in hilly or mountainous regions as well as on flat land. They are operated on fresh snow, on trails conditioned for snowmobile riding, on hard packed snow, on the icy surfaces of streams, rivers, and lakes, and on hard snow packed or icy roads.

Continuous drive tracks are conventionally used for engaging the snow covered surface, the icy surface or the surface of a body of water in order to provide the propulsion to move the snowmobile forward. In order to provide proper traction on snow and ice, as well as for uphill downhill and other conditions in which snowmobiles are used, the design of the track is very important. Generally speaking, the traction belt or track has a width substantially equal to the seat portion at the rear of the snowmobile. The track is drivably suspended on the frame of the snowmobile and is generally positioned at the rear portion of the snowmobile, while a pair of steerable skis support the front end of the snowmobile.

An example of a conventional track for a snowmobile is shown in U.S. Pat. No. 3,623,780. The track is generally made of an elastomeric material, with a plurality of transversely mounted and longitudinally spaced, rigid, elongate drive cleats being secured or mounted on the outside of the track. The drive cleats, which are conventionally U-shaped in cross-section, provide traction with the terrain in order to propel the snowmobile in a forward direction. Braking of the snowmobile is also accomplished utilizing the track. In braking, the track is slowed or stopped, and the cleats on the track then dig into the snow or ice on the ground to slow and stop the snowmobile.

Although there are innumerable snowmobiles in use, all of which utilize tracks having some type traction means such as the cleats mentioned above, the drive systems comprising such tracts are not without problems which can be irritable and downright troublesome to the snowmobiler. When the snowmobile is bucking deep snow, attempting to climb hills, breaking a new trail through snow, or is being operated in numerous other modes involving high load conditions wherein traction is of great importance, the traction means, such as the cleats mentioned above, have a universal tendency to dig deeply into the snow and ultimately bog the snowmobile down in the snow. Heretofore, there has been no provision by which the track could be designed to provide necessary traction while at the same time providing lift for the track and the snowmobile to keep the track from digging deep into the snow and bogging the snowmobile down.

In U.S. Pat. No. 4,175,627, there is disclosed a lightweight propulsion system for a power driven ski device in which a continuous drive track is provided. The drive track is relatively small and lightweight, with the drive track having a width which is approximately only that of a ski. The drive track comprises resilient cleats which extent transversely across the width of the track and are spaced along the circumferential length of the track. The cleats comprise substantially flat fins which are angled with respect to the outer, longitudinal surface of the track, with the flat cleats making an acute angle with the surface of the track such that the cleats slant forward in a direction of rotation of the track as the track is driven in its normal operation of propelling the power driven ski device forward. The cleats, slanting forwardly in the direction of rotation of the track, dig downwardly into the snow to provide traction for the otherwise lightweight, power driven ski device. However, if such forward slanting cleats were used on a relatively heavy weight snowmobile, the track would quickly dig itself deeply into the snow and completely bog the snowmobile down.

3. Objectives

A principal objective of the invention is to provide a novel, resilient, flexible cleat which is readily attached by a single attachment member to the outer surface of an endless traction belt or track used in driving snowmobiles, with the flexible cleat comprising a relatively narrow, elongate, essentially planar fin or strip of resilient material extending outwardly from the snowmobile track and a relatively narrow, elongate, essentially planar mounting flange extending along an elongate side edge of the fin for mounting flatwise against the outer surface of the snowmobile track, wherein a series of sharp projections extend from the face of the flange to engage the outer surface of the snowmobile track to stabilize the cleat relative to the track.

A particular objective of the present invention is to provide a plurality of such resilient, flexible cleats attached to and spaced about the length of the track of a snowmobile, 1 wherein the fins are oriented to slope from the surface of the snowmobile track at an acute angle and in the opposite direction of travel or rotation of the snowmobile track, whereby such track not only exhibits exceptional traction for high speed but also develops an unexpected lift which pulls the track and the snowmobile upwardly and over the surface of snow when the snowmobile is being operated over light or deep snow.

Another objective of the present invention is to provide inexpensive, resilient, flexible cleats which can be quickly and easily installed on essentially all conventional tracks used in propelling snowmobiles to increase the effective traction of such tracks and in addition to provide such tracks with a completely unexpected lift characteristic in combination with the increased traction.

BRIEF DESCRIPTION OF THE INVENTION

The above objectives are achieved in accordance with the present invention by providing novel, unique cleats made of a resilient, flexible material, wherein the cleats are adapted to be quickly and easily attached by a single attachment member to the outer surface of endless traction belts or tracks used in propelling a snowmobile. The cleats comprise relatively narrow, elongate, essentially planar strips, slats or fins which are attached by a single attachment member, such as a rivet, to the outer surface of the snowmobile track. The cleats extend transversely across the track, and a plurality of cleats are preferably used for each track, with the cleats being spaced along the circumferential length of the track. The planar slats or fins of the cleats are angled with respect to the outer, longitudinal and circumferential surface of the track, with the planar slats or fins making an acute angle with the outer surface of the track such that the planar slats or fins slant rearward of the direction of travel or rotation of the track as the track is driven in its normal operation of propelling the snowmobile forward. The slats or fins preferably slant backwardly or rearwardly of the travel or rotation of the track, making an acute, included angle with the surface of the track of between about 30 and 80 degrees, most preferably between about 70 and 80 degrees.

A mounting flange is provided for attaching the cleat to the track of the snowmobile. The flange extends along the upper elongate side edge of each of the slats or fins comprising the cleats. The flange is preferably formed integrally with the slat or fin of the cleat. Advantageously, the flange and the slat or fin are molded integrally from an elastomeric polymer which is both resilient and flexible. The flange and the slat or fin together form the cleat of the present invention. When installed on the track of a snowmobile, the flange of the cleat extends from the mutually corresponding slat or fin in a direction of the forward movement of the track. The flange lies flatwise on the outer surface of the track and is firmly attached to the track by a single fastening member such as a rivet. The face of the flange which lies on the surface of the track is provided with a plurality of sharp projections extending therefrom. The projections securely engage the surface of the snowmobile track and prevent movement of the cleat relative to the track.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 1 is a pictorial representation of a snowmobile track in accordance with the present invention, wherein the track includes a plurality of resilient, flexible cleats of the present invention attached to the outer surface of the track;

FIG. 2 is a cross-sectional view of the track and cleat member of the present invention as taken along line 2—2 of FIG. 1 showing one means of attaching the cleat member to the track as well as one preferred embodiment of projections on the face of the cleat member engaging the track; and FIG. 3 is a pictorial representation of a preferred embodiment of a resilient, flexible cleat in accordance with the invention showing a second preferred embodiment of projections on the face of the cleat member which engages the track.

DETAILED DESCRIPTION OF THE ILLUSTRATED EMBODIMENTS

The novel cleats of the present invention and the improved endless traction belt or track incorporating the novel cleats are advantageously used in combination with any of the numerous snowmobiles as disclosed in the prior art as well as commercially available in the marketplace. A typical snowmobile comprises an elongated main body portion having a passenger-carrying seat mounted on the rear portion thereof and a front body portion comprising a hood or housing with a drive motor mounted therein. The front body portion is supported at least in part by a pair of skis in a conventional manner. The skis are suitably mounted to the snowmobile for pivotable movement, with the skis further being operatively connected to a handle bar which is used by the operator of the snowmobile to move the skis and guide the snowmobile.

An endless traction belt or track is supported by an appropriate suspension system which is in turn associated with the main body portion of the snowmobile. The track is driven by means of a transmission system coupled between the drive motor and the track. The front and rear body portions, drive motor, skis, suspension system and transmission system of a snowmobile are well known in the prior art and will not be described in detail here. In fact, the foregoing, brief description of a snowmobile is intended to provide general information only about the basic construction of a snowmobile.

As mentioned previously, a principal objective of the present invention is to provide a novel, resilient, flexible cleat which is readily attached to the outer surface of an endless traction belt or track used in driving snowmobiles. The cleats are installed on an existing track using a single attachment member for each cleat. The attachment member can be a rivet or a screw and nut.

Figure 1:
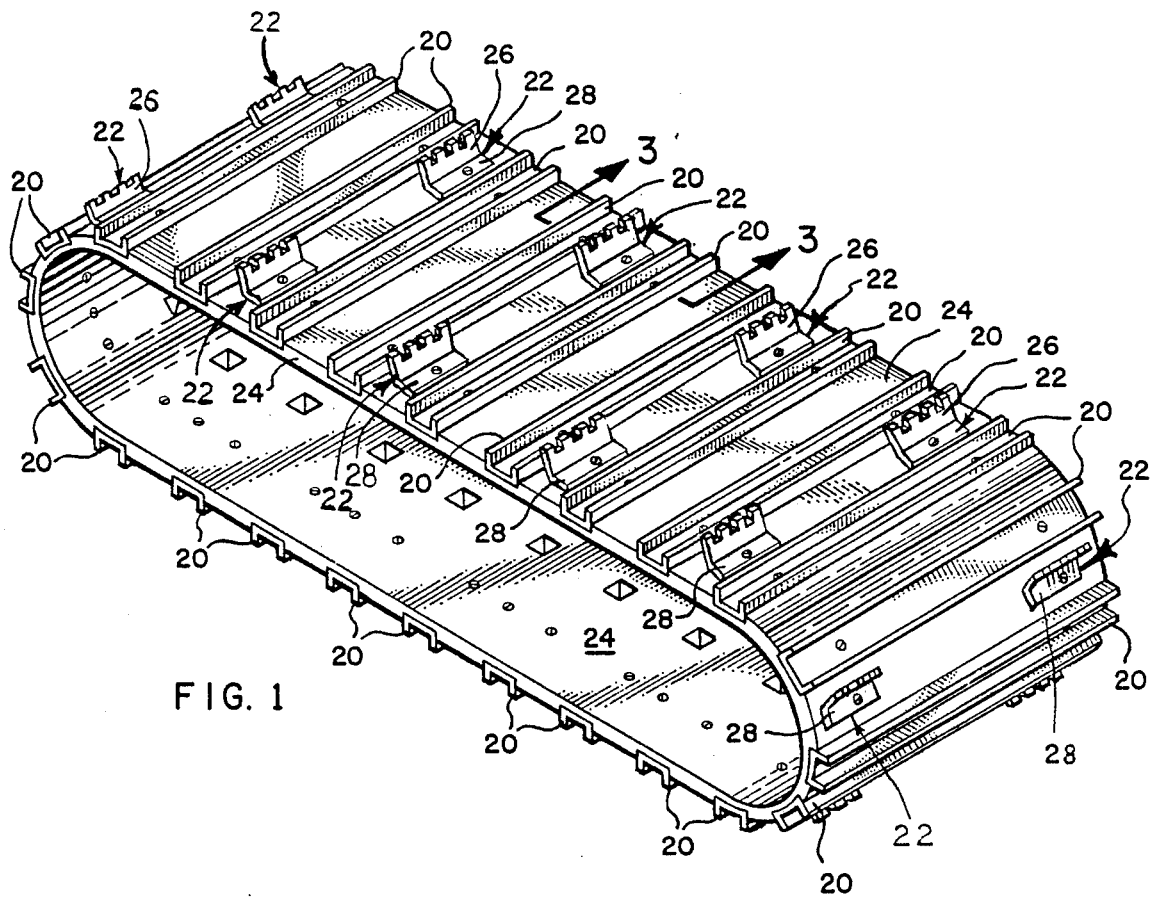
Figure 2:
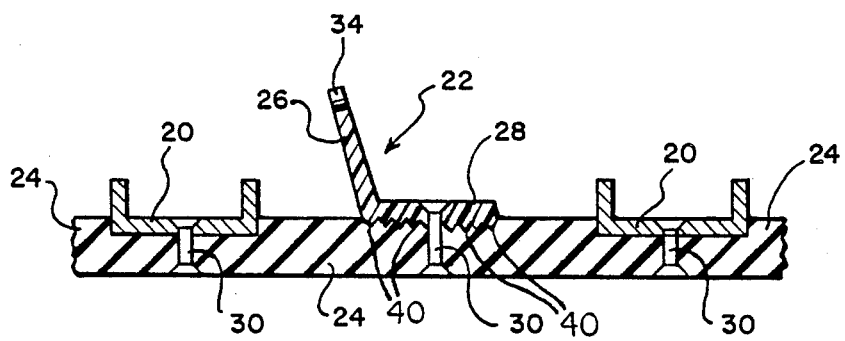

A track 24 in accordance with the present invention is shown in FIGS. 1 and 2. As illustrated, the track 24 is of the type comprising a single piece, endless belt formed of a resilient rubber-like material as is well known in the art. The track 24 could just as well be formed of several narrower belts which are held together in alignment to form the broader track. A track of the latter type is shown and described in U.S. Pat. No. 3,390,689. In the latter type belt, the multiple, narrower belts are usually held together by a plurality of transverse cleats. Even in single piece tracks 24 such as illustrated in FIGS. 1 and 2 of the accompanying drawings, it is customary to provide the transverse cleats. These customary cleats are shown by the reference number 20 in the accompanying drawings.

As illustrated, the existing track 24 may comprise a plurality of the customary cleats 20 extending thereacross. The customary cleats 20 are usually formed of metal and have a generally u-shaped cross-section. The legs of the u-shaped members extend away from the surface of the track 24 so as to engage the surface over which the snowmobile is being operated. In accordance with the illustrated embodiment of the present invention, a plurality of new, improved cleats 22 are installed on the track 24, with the new cleats 20 extending transversely across the track 24 at positions between adjacent, customary cleats 20. It has been found that the new cleats 22 need not be installed between each of the adjacent cleats 20. The new cleats 22 can be spaced about the track 24 at random. As illustrated in FIG. 1 of the accompanying drawings, respective pairs of new cleats 22 are installed between matched pairs of customary cleats 20. The new cleats 22 could be installed singly, in pairs or in triplicate between every matched pairs of the customary cleats 20 or at random around the track.

Figure 3:
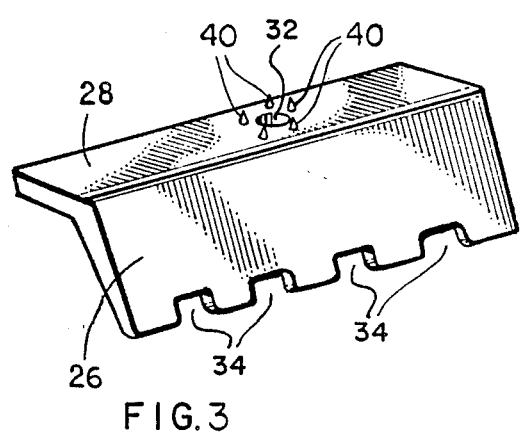

One preferred form of the new, improved cleat 22 in accordance with the present invention is shown in FIGS. 1 and 2 as installed on the track 24. A similar but slightly modified embodiment of the improved cleat 22 is shown in FIG. 3. Each of the new, improved cleats comprises a relatively narrow, elongate essentially planar strip, slat or fin 26. As shown in FIGS. 1 and 2, the fins 26 are attached to the outer surface of the snowmobile track 24, with the fins 26 extending transversely across the track 24. The planar fins 26 of the cleats 22 are angled with respect to the outer surface of the track 24. The fins 26 make an acute angle with the outer surface of the track 24 so that the fins 26 slant rearward of the direction of travel or rotation of the track 24 as the track 24 is driven in its normal operation of propelling the snowmobile in a forward direction. The intended direction of travel of the track 24 of FIG. 1 is counterclockwise or as shown by the arrow in FIG. 1. The fins 26 preferably slant backwardly or rearwardly of the travel or rotation of the track 24, making an acute, included angle with the surface of the track 24 of between about 30 and 80 degrees, most preferably between about 50 and 80 degrees.

As illustrated, each of the new, improved cleats comprise a relatively narrow, elongate, essentially planar flange 28 which is formed along the upper elongate side edge of the fin 26. The flange 28 is preferably formed integrally with the fin 26. The new cleat 22 is made of a resilient material, with the cleat 22 preferably being molded from an elastomeric polymer which is both resilient and flexible. Advantageously, the new cleat 22 is molded from a polyurethane material. The flange 28 and the fin 26 of the new cleat 22 are oriented with respect to each other so as to form an included angle of between about 98 and 165 degrees. Preferably, the included angle between the flange 28 and fin 26 of the cleat 22 is between about 110 and 145 degrees. The width of the fin 26 and the flange 28 is advantageously between about 2.5 and 4 centimeters. The fins 26 have a length of no greater than about 10 centimeters. The length of the flanges 28 is substantially the same as the length of the mutually respective fins 26.

The flange 28 of each cleat 22 is made to lie flatwise on the outer surface of the track 24 and is firmly attached to the track 24 by appropriate fastening means such as rivets 30 as shown in FIG. 2. For this purpose, a spaced opening 32 is provided in the flange 28 of each cleat 22 to accept the rivet 30. It is well known in the art to use rivets 30 or other elongate fastening means such as screws to attach the customary cleats 20 to the track, and further description of such fastening means is not deemed necessary. When installed on the track 24, the flange 28 extends from the mutually corresponding fin 26 in a direction of the forward movement of the track 24 so that the fin 26 will make its appropriately slanted angle with the surface of the track 24.

To stabilize the cleat member 22 about its single attachment rivet 30 such that the cleat member 22 will not rotate or move relative to the surface of the track 24, a plurality of sharp projections 40 are provided extending from the broad side of the flange 28 which lies against the outer surface of the track 24. In this regard, the sharp projections extend from the broad side of the flange 28 which faces away from the mutually respective fin 26. The projections 40 thus dig into and engage the outer surface of the endless belt forming the track 24 when the cleat member 22 is attached tightly to the track 24. As shown in FIG. 2, the projections 40 comprise a series of sharp edged ridges formed in the surface of the flange 28. As shown in FIG. 3, the projections 40 comprise a plurality of sharp pointed protuberances formed in the surface of the flange 28. Preferably, the sharp pointed protuberances are formed to circumscribe the opening 32 in the flange 28 and are equally spaced about the opening 32.

In a preferred embodiment of the cleat 22 of the present invention as illustrated in FIG. 3 of the accompanying drawings, the fin 26 is tapered inwardly in a direction towards its free edge, i.e., the edge thereof which is not connected to the flange 28. In other words, the thickness or depth of the planar fin 26 gradually decreases as the fin 26 extends from the flange 28, This tapering of the fin 26 allows the free edge portion thereof to flex and readily adjust itself to objects and bumps in the surface over which the snowmobile is being operated. This flexure allows the free edge of the cleat 22 to bend when an object or bump is encountered so as to yield rather than to break or tear the edge of the cleat 22. Because the cleat 22 is made of a resilient, flexible material, the fin 26 thereof is adapted to bend and yield even if the thickness thereof is not tapered. However, tapering of the fin 26 enhances its characteristic to yield and bend rather than to break or tear when an obstacle or bump is encountered.

The free edge of the fin 26 of the cleat 22 can also be provided with a series of indentations or cutouts 34 so as to form a serrated edge. The cutouts or serrations tend to improve the traction of the cleats 22 when the snowmobile is being driven over hard packed snow or ice. It should be recognized, however, that the tapering of the fin 26 and the serrations 34 in the free edge thereof are not essential but rather discretionary in character.

Although preferred embodiments of the cleat 22 and track 24 of the present invention have been illustrated and described, it is to be understood that the present disclosure is made by way of example and that various other embodiments are possible without departing from the subject matter coming within the scope of the following claims, which subject matter is regarded as the invention.

I claim:

1. A cleat for mounting on the outer surface of an endless belt used as a track for a snowmobile, said cleat comprising a relatively narrow, elongate, essentially planar fin whose elongate length is no greater than about ten centimeters and whose width is no greater than about 4 centimeters;

a relatively narrow, elongate, essentially planar flange extending along an elongate side edge of said fin, wherein said flange has an elongate length which is substantially the same as the length of said fin, and said flange has a width which is no greater than about 4 centimeters;

an opening through said flange for use in attaching said flange to the outer surface of an endless belt used as a track for a snowmobile, said opening extending between a first broad side of said flange which faces said fin and a second broad side of said flange which faces away from said fin; and a plurality of sharp projections extending from the second broad side of said flange which faces away from said planar fin such that the projections engage the outer surface of the endless belt when the cleat is attached to the endless belt.

2. A cleat in accordance with claim 1, wherein said projections comprise a series of sharp edged ridges formed in the surface of the second broad side of said flange.

3. A cleat in accordance with claim 1, wherein said projections comprise a plurality of sharp pointed protuberances formed in the surface of the second broad side of said flange.

4. A cleat in accordance with claim 3, wherein said sharp pointed protuberances are formed to circumscribe said opening in said flange.

5. A cleat in accordance with claim 4, wherein said sharp pointed protuberances are equally spaced about said opening in said flange.

6. A cleat in accordance with claim 5, wherein the elongate free side edge of said fin opposite said side edge along which said flange extends has serrations formed therein.

7. A cleat in accordance with claim 6, wherein said flange slants with respect to said fin such as to make an included angle with the fin of between about 98 degrees and 165 degrees.

8. A cleat in accordance with claim 7, wherein the included angle is between about 110 degrees and 145 degrees.

9. A cleat in accordance with claim 1, wherein the elongate free side edge of said fin opposite said side edge along which said flange extends has serrations formed therein.

10. A cleat in accordance with claim 1, wherein said flange slants with respect to said fin such as to make an included angle with the fin of between about 98 degrees and 165 degrees.

11. A cleat in accordance with claim 10, wherein the included angle is between about 110 degrees and 145 degrees.

12. A cleat in accordance with claim 11, wherein said projections comprise a series of sharp edged ridges formed in the surface of the second broad side of said flange.

13. A cleat in accordance with claim 11, wherein said projections comprise a plurality of sharp pointed protuberances formed in the surface of the second broad side of said flange.

14. A cleat in accordance with claim 13, wherein said sharp pointed protuberances are formed to circumscribe said opening in said flange.

15. A cleat in accordance with claim 14, wherein said sharp pointed protuberances are equally spaced about said opening in said flange.

16. A cleat in accordance with claim 15, wherein the elongate free side edge of said fin opposite said side edge along which said flange extends has serrations formed therein.

17. A cleat in accordance with claim 1, wherein the fin and the flange are molded integrally from a resilient, flexible material.

* * * * *